No. 617,670. Patented Jan. 10, 1899.
W. H. CHAPPELL.
METAL PLANING TOOL.
(Application filed July 15, 1897.)
(No Model.)
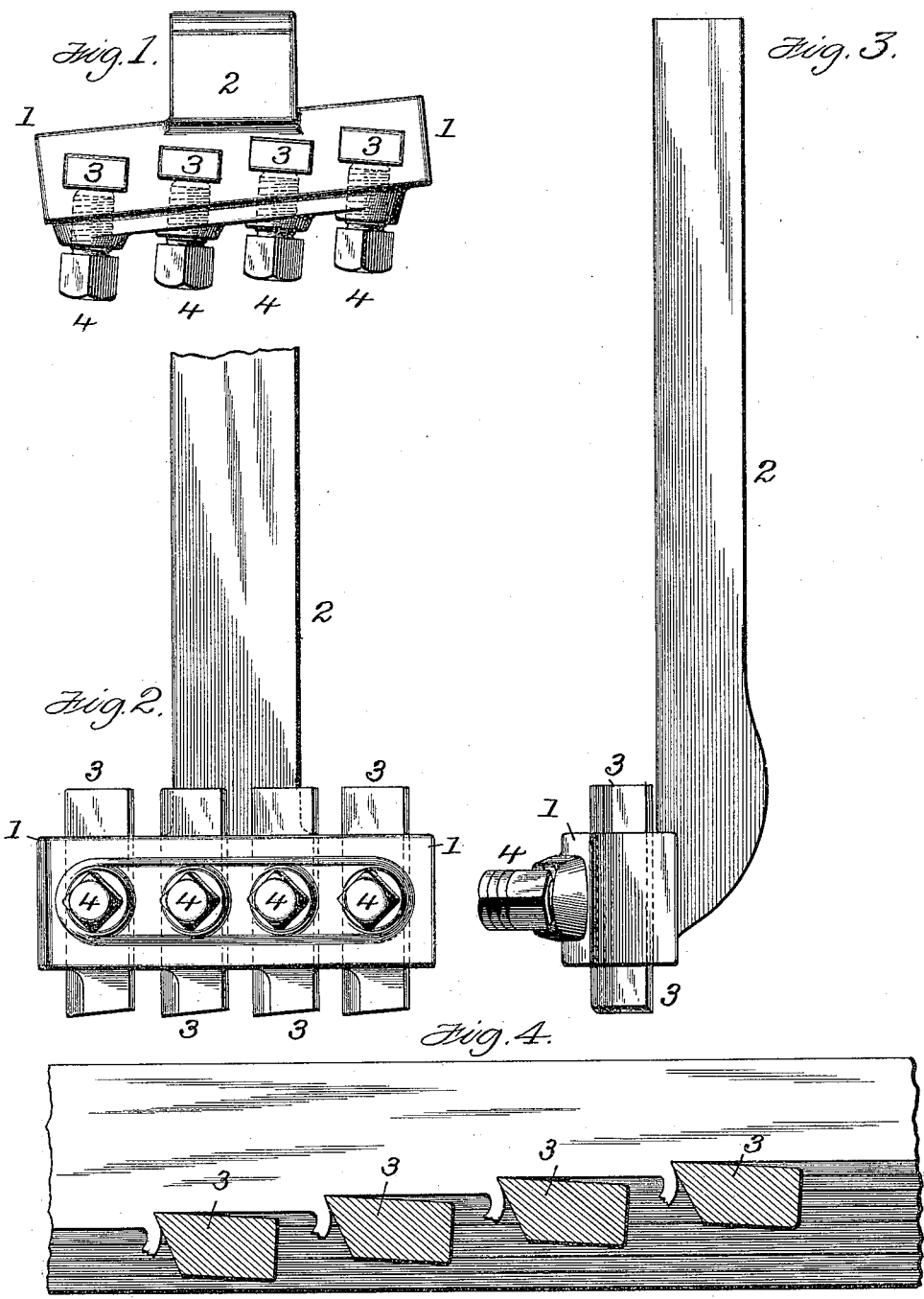

UNITED STATES PATENT OFFICE.

WILLIAM H. CHAPPELL, OF CHICAGO, ILLINOIS.

METAL-PLANING TOOL.

SPECIFICATION forming part of Letters Patent No. 617,670, dated January 10, 1899.

Application filed July 15, 1897. Serial No. 644,690. (No model.)

*To all whom it may concern:*

Be it known that I, WILLIAM H. CHAPPELL, a citizen of the United States, residing at Chicago, in the county of Cook and State of Illinois, have invented a certain new and useful Improvement in Metal-Planing Tools, (patented in Great Britain May 5, 1897, No. 11,244;) and I do hereby declare the following to be a full, clear, and exact description of the same, reference being had to the accompanying drawings, forming a part of this specification.

The present invention relates to a tool for planing or shaping metals and which is intended for use in that type of planing or shaping machines in which the metal piece or the tool has a rectilinear movement with relation to the other.

The present improvement has for its object to provide a simple and efficient tool or cutter for such uses in the operation of which at each stroke of the planing or shaping machine a series of independent and simultaneously-successive cuts will be taken of the full depth required, the result being that a much wider surface can be planed at each stroke of the machine in a practical and successful manner than could be done with a single cutter of the same width of cutting edge. I attain such object by the construction and arrangement of parts illustrated in the accompanying drawings, in which—

Figure 1 is a plan view of the present improved tool or cutter for metal planing or shaping machines; Fig. 2, a front elevation of the same; Fig. 3, a side elevation of the same; Fig. 4, a plan view of a piece of metal partly planed, with the points of the series of obliquely-arranged cutters of the present invention shown in section and in relative operative position.

Similar numerals of reference indicate like parts in the several views.

Referring to the drawings, 1 represents the body of the tool-holder, and 2 the attaching-shank thereof, by which the tool-holder is secured in place in the metal planing or shaping machine.

3 are the series of cutters of the present invention, secured in or to the head or body 1 of the tool-holder in any usual and suitable manner.

In the construction shown in the drawings as illustrative of the present invention each of the series of cutters 3 is arranged in an individual orifice in the head 1, said orifices having individual clamping-screws 4 for securing and holding them in proper position.

In the present invention the series of cutters 3 has an oblique arrangement with relation to the line of movement and in a common and rectilinear plane, so that each cutter-point will remove an independent and simultaneously-successive cut of the full length and depth required. From such action it follows that very rapid and effective planing can be performed, in that the series of independent straight cuts will be planed along the surface acted upon regardless of its extent, each cut being slightly in advance of the next succeeding one.

Having thus fully described my said invention, what I claim as new, and desire to secure by Letters Patent, is—

A tool or cutter for planing or shaping machines, comprising in combination, a head or holder, a series of independent cutters secured therein, and means for clamping said cutters in place, the cutting-points of said cutters being arranged in a common and rectilinear plane, and obliquely to the line of movement, so that each cutting-point will remove an independent and simultaneously-successive cut of the full depth required, substantially as set forth.

In testimony whereof witness my hand this 10th day of July, 1897.

WILLIAM H. CHAPPELL.

In presence of—
ROBERT BURNS,
JAMES LAVALLIN.